United States Patent Office 3,385,114
Patented May 28, 1968

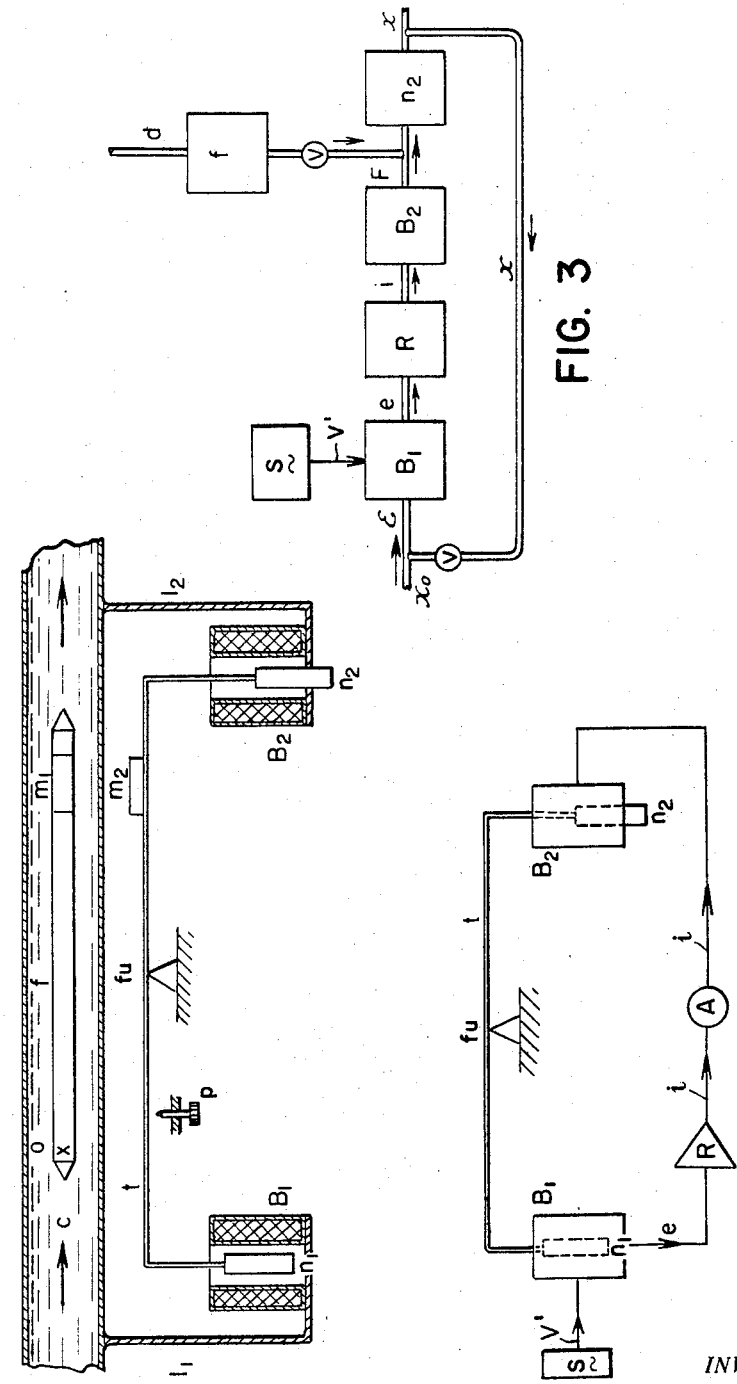

3,385,114
DEVICE FOR CONTINUOUS LIQUID SPECIFIC GRAVITY MEASURING
Bartolomeu Capelo da Fonseca Franco Frazão, Lisbon, Portugal, assignor to Companhia União Fabril, S.A.R.L., Lisbon, Portugal, a Portuguese firm
Filed Jan. 25, 1966, Ser. No. 522,960
Claims priority, application Portugal, Feb. 26, 1965, 43,662
3 Claims. (Cl. 73—434)

ABSTRACT OF THE DISCLOSURE

An apparatus for measuring continuously the specific gravity of a fluid passing through a piping of nonferromagnetic material. A tubular float is pivotally mounted at one end in the piping and immersed in the fluid. A self-balancing electromagnetic weighing set is rigidly connected to the piping. The weighing set has a pivoted lever with a ferromagnetic core at one end and a permanent magnet at the other end. A second permanent magnet is mounted on the float and a third permanent magnet is mounted on the lever of the weighing set acting repulsively on the second magnet. A pivoting of the float due to a change in specific gravity of the fluid in the piping causes a pivoting of the lever which gives rise to a voltage change in the electromagnetic system which is recorded so as to register the specific gravity of the fluid circulating in the piping.

---

The invention relates to devices for continuous liquid specific gravity measurement.

According to one aspect of the invention a device for continuous liquid specific gravity measurement comprises a vessel through which the liquid is passed, a float, means for mounting the float in the vessel to pivot about a horizontal axis, the axis being disposed in the upstream direction with respect to the center of buoyancy of the float, and means for determining the effective weight of the float when the liquid is in the vessel.

Preferably, in operation, the float is completely immersed in the liquid and is tubular, being pivoted at one end. The vessel is preferably a pipe through which the liquid flows and which is arranged to be substantially horizontal in operation. The means for determining the effective weight of the float preferably comprises a force balance system operative to maintain the float in a substantially constant position.

According to another aspect of the invention a device for continuous liquid specific gravity measurement comprises a vessel through which the liquid is passed, a float in the vessel and a force balance system operative to maintain the float in a substantially constant position and to given an indication of the effective weight of the float.

Preferably the vessel is non-ferromagnetic and the force balance system comprises a magnet mounted on the float and correction means outside the vessel magnetically coupled with the magnet for maintaining the position of the float substantially constant. The correction means may comprise a further magnet which repulses the magnet on the float, the position of the further magnet being affected thereby, and means for maintaining the position of the further magnet substantially constant. In such an arrangement it is preferred that the position of the further magnet is transduced by a coil and core combination constituting a detector linked thereto, and the position of the further magnet is restored by a driving coil and core combination also linked thereto, there being provided a controller connected to receive the detector output and apply, in response thereto, a suitable correcting current to the driving coil, means being provided for indicating the correcting current, which is a function of the specific gravity of the liquid.

The invention will further be described with reference to the accompanying drawings, of which:

FIGURE 1 is a schematic side elevation of a device according to the invention.

FIGURE 2 is a block diagram with a conventional circuit illustrating the control circuit of the device; and FIGURE 3 is a control flow diagram for the device.

Referring to FIGURE 1 the device comprises a tubular float $f$ mounted within a pipe $c$ of nonferromagnetic material by a pivot having a transverse horizontal axis at O. The pipe $c$ is, in operation, supported horizontally and coupled to conduct the liquid the specific gravity of which is to be measured in such a way that the float is completely immersed therein.

The device further comprises a force balance system composed of a self-balanced weighing set which has a lever $t$ to which a core $n_1$ of ferromagnetic material, a permanent magnet $n_2$ and another magnet or a set of permanent magnets $m_2$ are rigidly fixed. In addition, the weighing set has two coils $B_1$ and $B_2$, the former being a coil which detects the position of the core $n_1$ and the latter a driving coil which exerts an electromagnetic force on the permanent magnet $n_2$. These coils are rigidly connected with pipe $c$ by means of parts that in FIGURE 1 are represented by $l_1$ and $l_2$. Inside the float $f$ a permanent magnet $m_1$ is placed in a position that enables it to exert a repulsive force on the magnet or magnet set $m_2$. A screw $p$ is a limiter of the weighing set lever movement, $fu$ being the weighing set fulcrum.

Referring to FIGURE 2, there is shown a controller R comprising an amplifier and a limiter for limiting the output thereof. The controller receives as its input a voltage from coil $B_1$ representative of the position of the lever $t$ and gives an output current $i$ to coil $B_2$ of such a sense and magnitude as to balance out any forces tending to move the lever $t$. The current $i$ is measured through an ammeter A and is linearly related to the specific gravity of the fluid in pipe $c$. This electrical signal may be used for measuring, computation, recording and automatic control. If it is required to indicate the specific gravity not at the operating temperature but at a reference temperature it is possible to make the respective correction to the reading given by current $i$ by means of a known process.

The diagram represented in FIGURE 2 shows the single loop used to obtain the automatic control of the weighing set lever position and thus the automatic control of the float position in the present device. Such automatic position control renders the device output current $i$ independent, to a large extent, of the input voltage V′ obtained from a voltage source S of the transducing coil $B_1$, or of the amplifier gain and this endows the device with a high repeatability for specific gravity measurements.

FIGURE 3 is a control flow diagram for the device, the working principle of the device is in brief, the continuous weighing of the float immersed in the liquid through a self balanced electromagnetic weighing which does not mechanically contact with the float. As this apparent weight, which unbalances the weighing set, depends on the liquid specific gravity, the electric current required to rebalance it is related to the fluid specific gravity and it can be used as a measure of the fluid specific gravity.

In fact the float is kept in balance by means of three forces; actual weight P acting downwards; buoyancy I from the liquid and magnetic repulsion M from the magnets $m_1$ and $m_2$ respectively fixed on the float and on one of the weighing set arms (see FIGURE 1) operating upwards. The torque balance equation is:

$$(P \times a) = (I \times b) + (M \times c) \quad (1)$$

where $a$, $b$ and $c$ are the arms corresponding to each force and $$I = V \times d \quad (2)$$

V being the float volume and $d$ the specific gravity of the liquid. Whenever the liquid specific gravity changes the float moves slightly and the repulsive force M changes too. From (1) and (2) we get $$\Delta M = -K_1 \Delta d \quad (3)$$

where $\Delta M$ is the variation of the repulsive force M, $\Delta d$ the corresponding specific gravity $d$ variation, and $K_1$ a constant obtained from the constances of (1) and (2). If M changes, the weighing set suffers a slight unbalance which causes a displacement $\epsilon$ of the core $n_1$ inside the coil $B_1$. In this coil, which is a differential transformer the displacement $\epsilon$ gives rise to an electrical voltage $e$ with the frequency of the voltage V' that feeds the primary winding of the differential transformer as shown in FIGURE 3. Voltage $e$, for its part, is the input of the automatic controller R which sends a continuous current $i$, to the driving coil $B_2$; this current gives rise to a force F on the permanent-magnet $M_2$ and therefore, on the weighing set lever. This lever is subjected to three forces: own weight P', acting downwards (at the fulcrum left or right according to the position of its center of gravity), repulsive force M and driving coil electromagnetic force F. From the torque balancing equation following a reasoning similar to the one that led us to Equation 3 it can be concluded that:

$$\Delta F = -K_2 \Delta M \quad (4)$$

where $K_2$ is a constant.

From (3) and (4) we have $$\Delta F = K_1 K_2 \Delta d \quad (5)$$

i.e. the force F variations are proportional to the specific gravity variations of the liquid. On the other hand as the direct current $i$ which passes through the coil $B_2$ is related to the force F that operates on the permanent-magnet $n_2$ by means of equation $$\Delta i = K_3 \Delta F \quad (6)$$

where $K_3$ is a constant, we obtain from (5) and (6) the equation $$\Delta i = K_1 K_2 K_3 \Delta d \quad (7)$$

which is the basic equation of the control arrangement.

Some advantages of the device illustrated in accompanying drawings can be understood by comparison with known continuous liquid specific gravity measuring apparatus which uses a float, the position of which with respect to the free surface of the liquid depends on the specific gravity of the liquid. This position can be transduced into an electrical signal for either remote indication and recording or an automatic control of the specific gravity through several well known methods such as for instance, a differential transformer, a photoelectric cell follower and others. This apparatus allows a high sensitivity in the specific gravity measurements—a sensitivity that namely depends on both the float volume and the diameter of the tube emerging out of the free liquid surface. Its responsibility is, however, low when in a continuous operation for the following reasons:

(1) Difficulty in maintaining accurately constant the level of the free liquid surface due to the frequent disturbances of the measuring vessel feeding flow;

(2) Difficulty in avoiding aleatory movements of the float due to the fluid renewal in the measuring vessel;

(3) Aleatory friction forces due to necessary mechanical guidance of the float over its whole movement; and (4) Input voltage fluctuations of the float position detection device.

The device in accordance with the invention described with reference to the accompanying drawings allows the elimination, or at least a high reduction of these inconveniences and so allows a high sensitivity and a high repeatability of the measurements. It is not necessary that the liquid free surface should be constant to keep this device operating well as it operates completely immersed in a closed pipe under any operating pressure of the fluid. The fluid renewal in the measuring vessel has no influence, or at worst only a slight one, on the float position since the float is horizontally placed, i.e. aligned with the liquid flow lines and is pivoted at the upstream end. Further, the float has no longitudinal movements and thus it needs no guides in this direction; the float has only a rotating and very slight movement around the aforesaid pivot.

As was mentioned above, the effect of fluctuations of the input voltage to the present device are negligible due to the action of the feed-back circuit for the automatic control of the float position.

Besides a higher repeatability compared with known devices, the present device has, moreover, a shorter response time. The dimensions of the vessels containing the float and the liquid in known devices must be large enough to allow the float vertical movement corresponding to the total range of the specific gravity values to be measured; in the present device the float is practically motionless and the dimensions can be substantially reduced, so allowing a reduction of the required time for the liquid renewal in the measuring vessel and consequently the reduction of the device response time.

What we claim is:

1. Device for continuous liquid specific gravity measuring comprising a first unit comprising a piping of non-ferromagnetic material through which a fluid circulates whose specific gravity is to be measured, a tubular float pivotably mounted at one end in said piping and immersed in said fluid, a second unit rigidly connected to said first unit comprising a self-balancing electromagnetic weighing set comprising a pivoted lever, a ferromagnetic core at one end of said lever and a first permanent magnet at the other end of said lever, an electromagnetic system cooperating with said core and magnet to automatically balance said lever, a second permanent magnet mounted on said float and spaced from said pivot mount, a third permanent magnet mounted on said lever proximate to said second magnet acting repulsively on said second magnet, so that a pivoting of said float due to a change in specific gravity of the fluid in said piping will cause a pivoting of said lever to give rise to a current change in said system and means for recording said current change to register such change of specific gravity.

2. A device as set forth in claim 1, wherein said float is pivoted at its upstream end.

3. A device as set forth in claim 1 wherein said means for recording said current change comprises an amplifier a rectifier, and an ammeter.

References Cited

UNITED STATES PATENTS 1,707,822 4/1929 Stock _____ 73—30
2,914,310 11/1959 Bahrs _____ 177—210

FOREIGN PATENTS 793,630 4/1958 Great Britain.

RICHARD C. QUEISSER, *Primary Examiner.*

J. D. SCHNEIDER, *Assistant Examiner.*